Sept. 20, 1960  F. J. McENTEE, JR  2,953,365
PROCESS AND APPARATUS FOR CONTINUOUS
CALCINATION OF GYPSUM AND THE LIKE
Filed Dec. 17, 1956  3 Sheets-Sheet 3
FIG. 6.
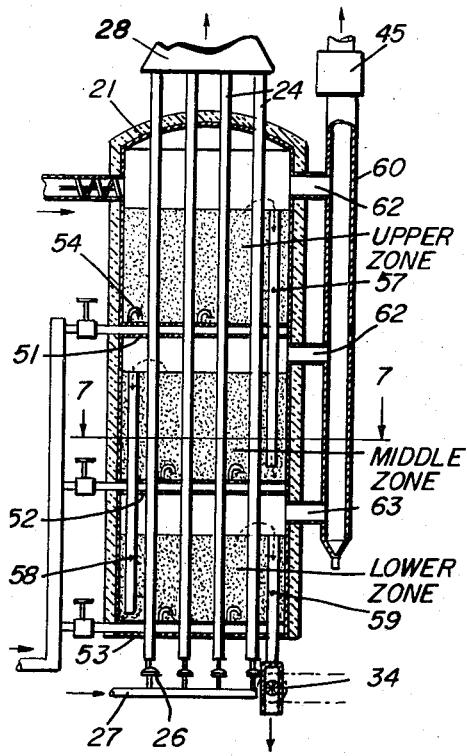
FIG. 9.
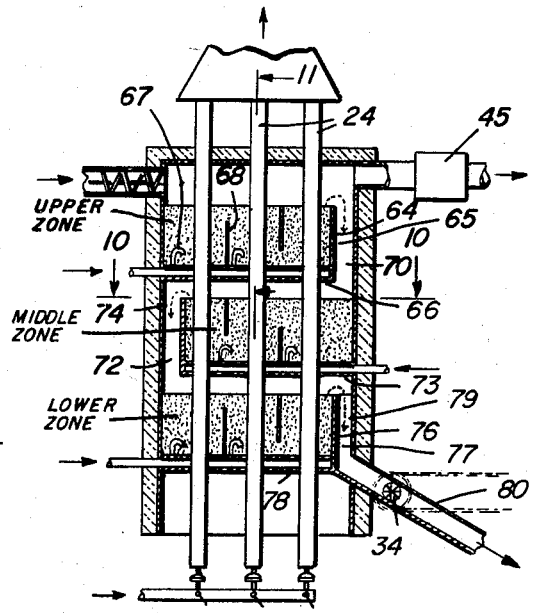
FIG. 10.
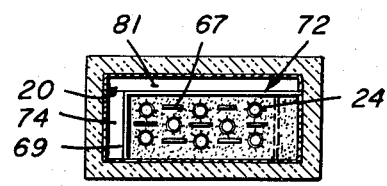
FIG. 7.
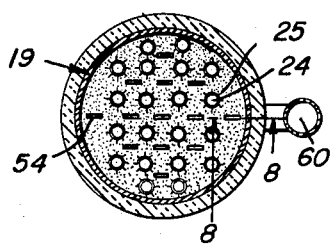
FIG. 12.
FIG. 11.
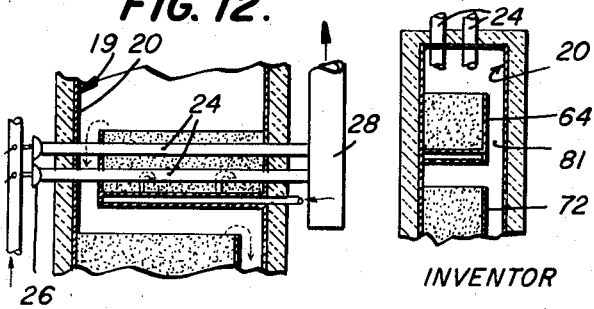
FIG. 8.
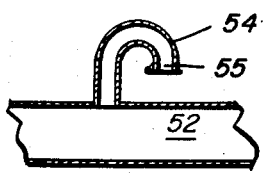
INVENTOR
FRANK J. McENTEE JR.
BY
ATTORNEY

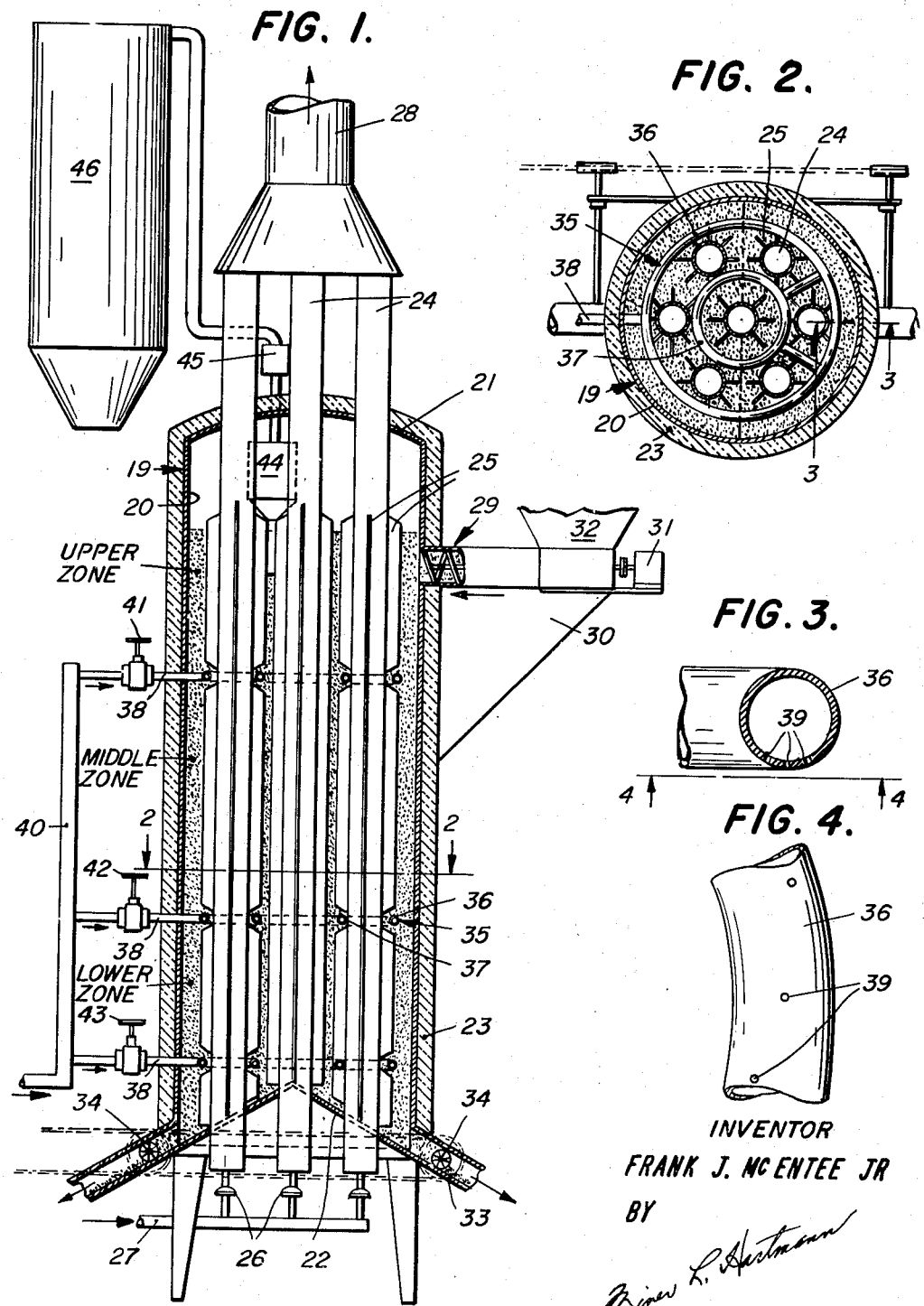
Sept. 20, 1960 — F. J. McENTEE, JR — 2,953,365
PROCESS AND APPARATUS FOR CONTINUOUS CALCINATION OF GYPSUM AND THE LIKE
Filed Dec. 17, 1956 — 3 Sheets-Sheet 1
INVENTOR
FRANK J. McENTEE JR
BY
ATTORNEY

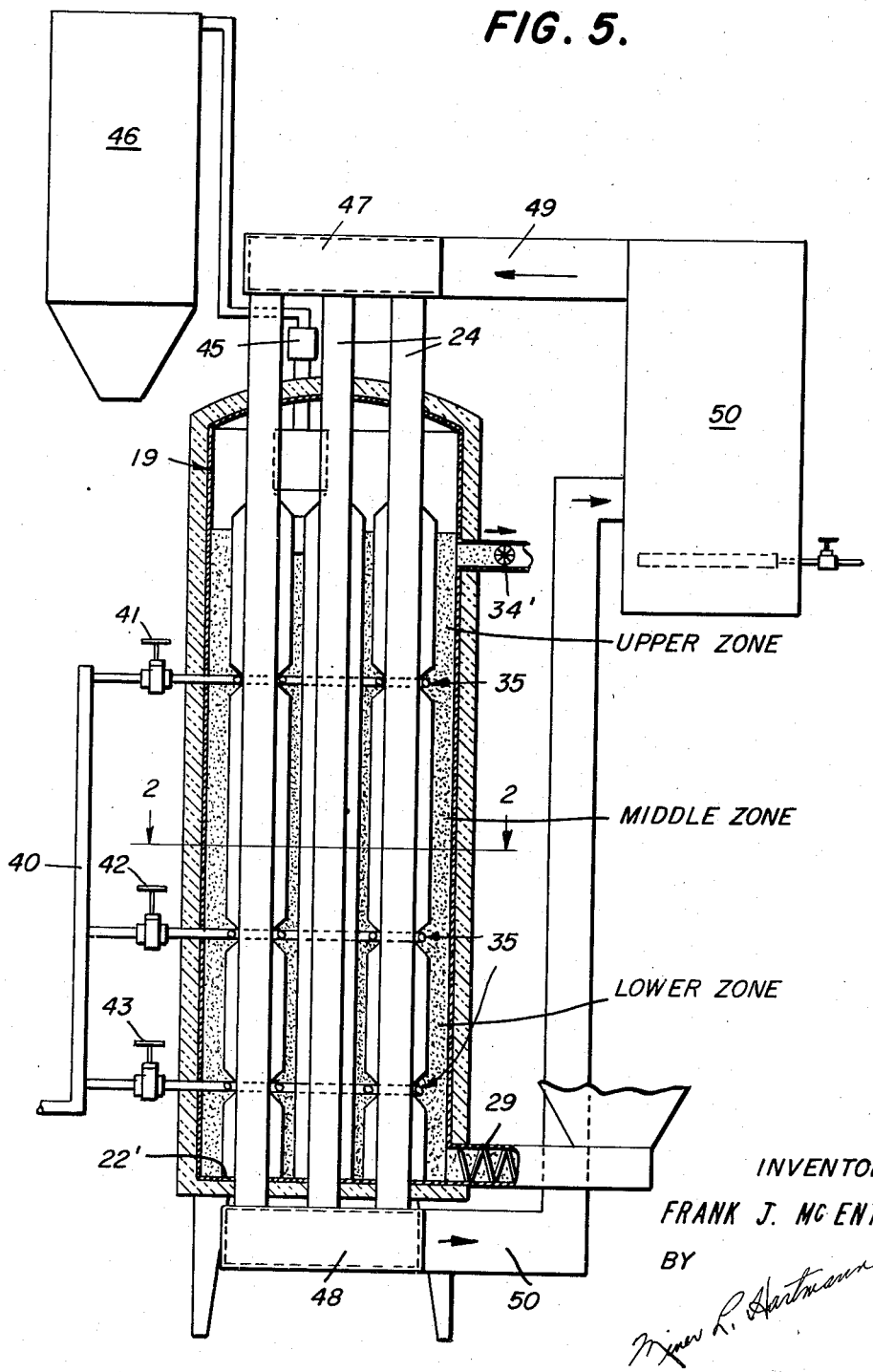

United States Patent Office

2,953,365
Patented Sept. 20, 1960

2,953,365

PROCESS AND APPARATUS FOR CONTINUOUS CALCINATION OF GYPSUM AND THE LIKE

Frank J. McEntee, Jr., 449 N. Oakhurst Drive, Beverly Hills, Calif.

Filed Dec. 17, 1956, Ser. No. 628,637

9 Claims. (Cl. 263—21)

This invention relates to a continuous process for the heat treatment or calcination of gypsum and the like and to continuous indirect heating and cooling apparatus.

One object of the invention is to provide a method for the continuous calcination or partial dehydration of pulverized gypsum to form gypsum plaster. Another object is to provide apparatus for the continuous heat treatment of fluidized powdered materials, such as, for example, gypsum. A further object is to provide means for the continuous calcination of fluidized pulverized gypsum under pressure to produce high quality gypsum plaster.

These and other objects are attained by my invention which will be understood from the following description, reference being made to the accompanying drawings in which:

Fig. 1 is a side elevation partly in section showing a preferred form of an indirectly heated calcining apparatus particularly adapted for calcining powdered gypsum under pressure;

Fig. 2 is a cross-sectional view taken on the line 2—2 of Figs. 1 and 5;

Fig. 3 is a fragmentary cross-sectional view taken on the line 3—3 of Fig. 2;

Fig. 4 is a side elevational view of the tubular member shown in Fig. 3;

Fig. 5 is a side elevational view partly in section showing an alternative form of my invention;

Fig. 6 is a side elevational view partly in section showing another form of my calcining apparatus;

Fig. 7 is a cross-sectional view taken on the line 7—7 of Fig. 6;

Fig. 8 is a fragmentary cross-sectional view taken on the line 8—8 of Fig. 7;

Fig. 9 is a second alternative form of a continuous gypsum calciner;

Fig. 10 is a cross-sectional view taken on the line 10—10 of Fig. 9;

Fig. 11 is a fragmentary cross-sectional view taken on the line 11—11 of Fig. 9; and Fig. 12 is a fragmentary side elevational view partly in section of a calciner similar to Fig. 9 in which the combustion tubes are disposed horizontally.

Referring particularly to Figs. 1 to 4, a preferred form of calcining apparatus following my invention consists generally of a closed vessel 19 comprising an outer elongated cylindrical shell 20, disposed vertically, having a top 21 and bottom 22, there being thermal insulation 23 applied to the outer surfaces. Extending longitudinally through the shell and protruding through the top and the bottom are gas tight combustion tubes 24 spaced within the vessel to provide heat to all parts of a mass of powdered material contained in the vessel around said tubes. The tubes 24 are provided with radial fins 25 arranged to conduct heat from the hot combustion gases inside the combustion tubes 24 to the fluidized powdered material surrounding the tubes. Burners 26, one for each of the combustion tubes 24, are provided at the lower end of each tube, the fuel, which may be either gas or oil, being conveyed to the burners by the manifold pipe 27. The control of the combustion, including the amount of combustion air entering the burner, follows the customary and well known practices of operating such equipment. The combustion gas, including excess air, is carried upwardly through the combustion tubes and delivers its heat through the fins 25 to the material surrounding the tubes, and the cooled combustion gases are vented to the air through a vent stack 28 arranged above the vessel. The powdered material to be heat treated is delivered to the top portion of the vessel by the screw feeder 29 which is disposed at one side of the vessel, being supported by the bracket member 30. The screw feeder is provided with a motor 31, and powdered material such as gypsum is delivered to the hopper 32 for feeding into the vessel 19 at regulated rates of feed. The bottom 22 is preferably arranged as an inverted V whose sloping surfaces direct the material at the lower end of the vessel 19 into oppositely disposed discharge chutes 33, the chutes being provided with sealed metering takeoff valves 34 so that the product of the calcination may be removed at regulated rates. Within the vessel 19 at three elevations there are provided network of pipes 35 arranged for example in concentric pipe circles 36 and 37 with inter-connecting pipes 38, the pipes 36 and 37 being provided with nozzles or openings 39 on the lower side, as indicated particularly in Figs. 3 and 4, these small openings (fluidizing jets) being arranged to uniformly fluidize the mass of powdered material in the vessel thereabove when a gaseous medium is introduced through them through the fluidizing gas manifold 40. The valves 41, 42 and 43 control the amount of fluidizing gas forced through the openings 39 in each of the network of pipes 35 which define the upper zone, the middle zone, and the lower zone within the vessel 19. Above the mass of material in the upper zone and within the shell there is provided a cyclone-type dust collector 44 which receives its charge of dust-laden fluidizing gas and water vapor evolved from the mass of material being treated, the gaseous portion being discharged outside the vessel through the pressure-reducing valve 45, which discharges to a dust collector device, such as the bag filter 46 which may be arranged adjacent the vessel.

The manner of operating this equipment will be clear from the functional description of the several parts. The raw gypsum (preferably about 80 percent through 100 mesh screen) is fed into the vessel 19 under pressure through the screw feeder 29 into the upper zone where the previously introduced material is already fluidized. Fluidizing agent, such as air or super-heated steam, is introduced through all three of the fluidizing pipe network 35 which define the three zones in the vessel, thus keeping the entire mass of raw gypsum and partly calcined gypsum fluidized at all levels, the degree of fluidization being such that temperature control is attained as desired at each elevation. In the upper zone the raw gypsum is pre-heated by contact with the fins 25 of the partly cooled combustion tubes 24. The material is heated to 250° to 270° F. in passing through the upper zone. In the middle zone the pre-heated raw gypsum is heated to the necessary temperature to remove the required portion of the water of crystallization in the pre-heated feed stock, the water vapor which is evolved assisting in the fluidization of the mass of material above, as for example, the upper zone. The material is progressively heated as it moves down the fluidized column to about 290° F., most of the heat energy being used in vaporizing the water of crystallization. The material is finished in the lower zone, where the temperature is raised to the range of 330° to 390° F. to produce the finished hemihydrate which is discharged through the metering takeoff valves. It is, of course, the removal of the finished product at the bottom, and the introduction of the raw material at the top of the vessel, which provides the downward flow.

The time cycle best suited for each gypsum rock depends upon numerous factors, but in general the processing time is from one-half to two hours.

The fluidizing means are arranged to create three broad zones of control, within each of which the temperature may be controlled within limits by the degree or extent of fluidization. If a steam atmosphere is maintained in the vessel, any over-calcined material may be rehydrated before being discharged. Superheated steam is the preferred fluidizing gas.

In Fig. 5 is shown a modified form of calcining apparatus following my invention which consists of the closed vessel 19, with a flat bottom plate 22', fluidizing means and heating tubes with fins passing through the fluidized material in the vessel. The tubes 24 in this arrangement are brought together by headers 47 (top) and 48 (bottom), extending to pipes 49 and 50 and circulating a heat transfer fluid, either gas, liquid or vapor, into and out of a boiler 50 or the like, which may be fuel heated. As shown, the heat transfer fluid at the higher temperature enters the header 47 and tubes 24 at the top of the vessel 19 and discharges at the bottom header 48 for return to the boiler 50. The raw pulverized material to be fluidized and calcined is pumped into the lower zone, and moves concurrently to the heat transfer liquid in the tubes 24 (with additional fluidizing as required in the middle and upper zones) to be discharged through the rotary seal valve 34' to a storage bin or the like. The fluidizing agent and the steam and gas giving off in the calcining operation are discharged through a pressure-reducing valve 45 followed by a dust collecting means 46. In other respects, this modified form is similar in construction and operation to the form shown in Figs. 1 to 4.

In another modification of my invention which is shown in Figs. 6 to 8, the reaction vessel is divided horizontally into separate compartments by a partition 51 at the bottom of the upper zone, another partition member 52 arranged at the bottom of the middle zone and a bottom member 53 arranged at the bottom of the lower zone, these partitions preferably being hollow and serving as manifolds for fluidizing nozzles 54 arranged so that the fluidizing fluid is projected downwardly (to avoid stoppage of the jet openings 55). The material in all zones is heated by contact with the fins 25 and the combustion tubes 24 to which they are attached, each tube being provided with a burner 26 connected to a manifold fuel pipe 27 at the bottom of the vessel. The upper ends of the tubes 24 extend through the top closure 21 and discharge the combustion gases to a vent stack 28. An overflow tube 57 is provided between the top zone and an intermediate zone, being arranged to receive overflow material adjacent the top of the material in the upper zone and to discharge it adjacent the partition member 52 which defines the bottom of the middle zone. Similarly, a second overflow tube 58 is provided between the middle zone and the lower zone, receiving overflow material from the vicinity of the upper level of the middle zone and discharging it adjacent the bottom member 53. Material is discharged from the lower zone by means of a third overflow tube or discharge tube 59 which receives material from the top of the lower zone and discharges it through the bottom member 53 through a metering takeoff valve 34. A vapor stack 60 extends from the bottom zone to the top of the vessel, being connected by connecting pipes 61, 62 and 63 to the gas space above each of the material zones, the collected vapor and fluidizing gases being released to the atmosphere through a pressure reducing valve 45 which permits the control of the pressure within the reaction vessel.

A modification of the form of apparatus shown in Fig. 6 is indicated in Figs. 9 to 12. In this modification the outer shell 20 having a closed top and combustion tubes 24 extending from the bottom through the top and having a screw feed to bring raw gypsum into the top zone is arranged similarly to the alternative form shown in Fig. 6. However, the reaction zones are arranged in the form of elongated, staggered, overlapping troughs within the reaction vessel. The trough 64, corresponding to the upper zone of the other forms of my invention, consists of side walls 65 and a hollow bottom member 66 which is provided with a plurality of fluidizing jets 67 and also with vertical baffle plates 68 to divert the flow of material from the inlet side to the outlet side 69, which is spaced from the adjacent side wall of the vessel to provide an overflow passage 70 for the material discharged from the upper trough 64. Discharged material from the upper trough overflows into the middle trough 72 which is similarly provided with a hollow bottom 73 having fluidizing jets 67 and vertical baffle plates 68 to guide the material from the overflow inlet to the outlet side 74 where the calcined material overflows and falls in the passage between the side wall of the vessel and the outlet side 74 of the middle trough 72. The overflow material from the middle trough 72 falls into the bottom trough 76 which consists of side wall 77 and hollow bottom 78 with fluidizing jets 67 and baffle plates 68 similar to those previously described. The material overflows from the outlet side 79 of the bottom trough into a discharge chute 80 which is provided with a metering takeoff valve 34. In this arrangement the troughs 64, 72 and 76 are disposed away from one side of the rectangular vessel to provide an internal vapor stack 81 which discharges to the atmosphere through a pressure reducing valve 45.

In the forms of my invention shown in Figs. 6 and 9, it will be apparent that the heat transferring tubes 24, with fins 25 extending out into the adjacent material, may be disposed horizontally instead of vertically as shown. This arrangement applied to the trough type construction of Fig. 9 is indicated in the fragmentary drawing Fig. 12. Each of the combustion tubes 24 extends through the side walls 20 of the vessel 19 and through the material in the respective troughs, the heat in each tube being regulated by regulation of the fuel burners 26 provided for each tube. The exhaust gases from the tubes are manifolded and collected into a common vent stack 28. The operation of the calciner with the horizontally disposed combustion tubes is similar to that with the tubes disposed vertically.

While I have described my apparatus as used in heating a pulverized fluidized material, I may also employ the same equipment and method for extracting heat or cooling fluidized material which may have been calcined in other equipment, such as, for example, a rotary calciner. The tubes 24 in this case are then cooled by circulating a cooling medium therethrough and thus utilizing the advantages of the excellent heat transfer brought about by moving a fluidized mass of pulverulent material over the fin tubes for cooling heated pulverized material.

My process is not limited to powdered material but is applicable to any pulverized material, even up to ¼ to ½ inch, which is capable of being fluidized by the introduction of a fluidizing fluid into the mass. While I have illustrated my invention by describing its application to the production of gypsum plaster materials from the mineral gypsum, I do not limit my invention to this material alone, since it is clearly applicable to the heat treatment of other pulverized materials.

While I have shown radial fins on the head conduction tubes in my apparatus, it will be understood that other forms of fins or bars or knobs may be employed, and these may be formed of any suitable highly conductive metal.

The advantages of my invention to the processing of gypsum, particularly, will be apparent from the above description. The process described, which may be carried out in several forms of equipment as indicated, permits the use of a circulating heat transfer fluid or of direct fired combustion tubes for heating fluidized raw gypsum material, this heating being in a counter-current manner which gives a high thermal efficiency. The form of the reaction vessel permits the calcination of the gypsum under any desired pressure, and thus there may be produced the alpha gypsum plaster which is the preferred form for use in gypsum plaster and the like. Further, the operation is continuous as distinguished from the commonly employed practice of making gypsum plaster by batch operation. The apparatus is simple, and the capital cost of the equipment and operating maintenance is low.

I claim:

1. The process of continuously calcining pulverized gypsum comprising the steps of forming a fluidized mass of powdered gypsum and partly dehydrated gypsum extending from the bottom to the top of a vertical vessel by introducing a non-reactive fluidizing agent at a plurality of elevations spaced substantially uniformly from one discharge end within said mass; heating said fluidized mass by conduction from temperature controlled heated tubular members submerged in each zone of said fluidized mass; continuously feeding powdered gypsum into one end of said vertically disposed mass; continuously discharging water vapor and fluidizing agent from the vessel containing said fluidized mass; and continuously drawing off the calcined gypsum product from the other end of said mass.

2. The process of continuously calcining pulverized gypsum comprising the steps of forming a plurality of zones of fluidized masses of powdered gypsum and partly dehydrated gypsum superimposed from the bottom to the top of a vertical vessel by introducing a non-reactive fluidizing agent into each zoned mass at the bottom of each zone; differentially heating each zoned fluidized mass by conduction from heated tubular members submerged therein; continuously feeding pulverized gypsum into the upper fluidized zone; continuously flowing heated gypsum material from each zone to a lower zone; continuously discharging water vapor and fluidizing agent from the several zoned fluidized masses; and continuously drawing off the calcined gypsum product from the bottom zone.

3. The process of continuosly calcining pulverized gypsum comprising the steps of forming a plurality of zones of fluidized masses of powdered gypsum and partly dehydrated gypsum superimposed from the bottom to the top of a closed vertical chamber by introducing a non-reactive fluidizing agent into each zoned mass at the bottom of each zone; differentially heating each zoned fluidized mass by conduction from heated tubular members submerged therein; continuously feeding pulverized gypsum into the upper fluidized zone; continuosly flowing heated gypsum material from each zone to a lower zone; continuously discharging water vapor and fluidizing agent under pressure from the said several zoned fluidized masses within said closed vessel; and continuously drawing off the calcined gypsum product from the bottom zone.

4. Apparatus for heat treating pulverized gypsum and the like comprising a vertically disposed reaction vessel having an enclosing shell with top and bottom closures; a plurality of high heat-conducting tubular members disposed within said vessel and extending through said vessel; means associated with said tubular members for directing the material flow in a vertical direction; means for circulating a heat transfer medium in each of said tubular members; means disposed horizontally across said vessel dividing said vessel into vertically disposed zones; fluidizer injecting means for introducing a fluidizing medium at the bottom of each of said zones; feed means for introducing raw pulverized gypsum or the like adjacent one end of said vessel; and discharge means for removing the product from the opposite end of said vessel.

5. Apparatus for calcining pulverized gypsum and the like comprising a vertically disposed reaction vessel having an enclosing shell with top and bottom closures; a plurality of high heat conducting combustion tubes disposed within said vessel and extending through said vessel; fin means associated with said combustion tubes for conducting heat into the fluidized gypsum surrounding said tubes and directing the flow of said gypsum in a vertical direction; fuel burners for each of said combustion tubes disposed at one end thereof; means disposed horizontally across said vessel dividing said vessel into vertically disposed zones; conduit means including nozzles for introducing a fluidizing medium at the bottom of each of several heating zones for said gypsum; feed means for introducing raw gypsum adjacent the top zone in said vessel; and discharge means for removing the product from said bottom zone.

6. Apparatus for calcining pulverized gypsum and the like comprising a vertically disposed reaction vessel having an enclosing shell with top and bottom closures; a plurality of combustion tubes within said vessel, disposed therein in vertical position to provide a plurality of superimposed heating zones gradating from hottest adjacent the bottom zone and coolest adjacent the top zone of said vessel; fin means associated with said combustion tubes for conducting heat into the fluidized gypsum surrounding said tubes and directing the flow of said gypsum in a vertical direction; fuel burners for each of said combustion tubes disposed at the lower end thereof; conduit means including nozzles for introducing a fluidizing medium at the bottom of each of said zones; feed means for introducing raw gypsum into the top zone in said vessel; rotary valve discharge means for removing the product from said bottom zone; means for discharging gas out of said vessel; and a pressure reducing valve means operatively connected to the gas discharge means.

7. Apparatus for calcining pulverized gypsum and the like comprising a vertically disposed reaction vessel having an enclosing shell with top and bottom closures; partition means for defining superimposed zones within said vessel; a plurality of combustion tubes within said vessel, disposed therein in vertical positions to provide a plurality of superimposed heating zones gradating from hottest adjacent the bottom zone and coolest adjacent the top zone of said vessel; fin means associated with said combustion tubes for conducting heat into the fluidized gypsum surrounding said tubes and directing the flow of said gypsum in a vertical direction; fuel burners for each of said combustion tubes disposed at the lower end thereof; conduit means including nozzles for introducing a fluid medium at the bottom of each of said zones; feed means for introducing raw gypsum into the top zone in said vessel; conduit means for overflowing fluidized material from each zone to the next lower zone; rotary valve discharge means for removing the product from said bottom zone; means for discharging gas out of said vessel; and a pressure reducing valve means operatively connected to the gas discharge means.

8. Apparatus for calcining pulverized gypsum and the like comprising a vertically disposed reaction vessel having an enclosing shell with top and bottom closures; partition means for defining superimposed zones within said vessel; a plurality of high heat conducting combustion tubes disposed within said vessel and extending through said top and bottom closures; fin means associated with said combustion tubes for conducting heat into the fluidized gypsum surrounding said tubes and directing the flow of said gypsum in a vertical direction; fuel burners for each of said combustion tubes disposed at the lower end thereof; conduit means including nozzles for introducing a fluidizing medium at the bottom of each of said zones; feed means for introducing raw gypsum into the top zone in said vessel; conduit means for overflowing fluidized material from each zone to the next lower zone; rotary valve discharge means for removing the product from said bottom zone; means for discharging gas out of said vessel; and a pressure reducing valve means operatively connected to the gas discharge means.

9. Apparatus for calcining pulverized gypsum and the like comprising a vertically disposed reaction vessel having an enclosing shell with top and bottom closures; partition means defining superimposed zones within said vessel; a plurality of high heat conducting combustion tubes disposed horizontally within said vessel in each zone; fuel burners for each of said combustion tubes disposed at one end thereof; conduit means including nozzles for introducing a fluidizing medium at the bottom of each of said zones; feed means for introducing raw gypsum into the top zone in said vessel; conduit means for overflowing fluidized material from each zone to the next lower zone; rotary valve discharge means for removing the product from said bottom zone; means for discharging gas out of said vessel; and a pressure reducing valve means operatively connected to the gas discharge means.

References Cited in the file of this patent

UNITED STATES PATENTS

| | | |
|---|---|---|
| 1,967,029 | Karrick et al. | July 17, 1934 |
| 2,525,790 | Garbo | Oct. 17, 1950 |
| 2,584,312 | White | Feb. 5, 1952 |
| 2,619,451 | Ogorzaly et al. | Nov. 25, 1952 |
| 2,639,215 | Bland | May 19, 1953 |
| 2,729,428 | Milmore | Jan. 3, 1956 |
| 2,761,668 | Sylvest | Sept. 4, 1956 |